United States Patent
Zhang et al.

(10) Patent No.: US 12,258,705 B2
(45) Date of Patent: Mar. 25, 2025

(54) NON-SOLVENT 2K POLYURETHANE ARTIFICIAL LEATHER COMPOSITION, ARTIFICIAL LEATHER PREPARED WITH SAME AND PREPARATION METHOD THEREOF

(71) Applicant: Dow Global Technologies LLC, Midland, MI (US)

(72) Inventors: Chao Zhang, Shanghai (CN); Yanli Feng, Shanghai (CN); Shihao Qin, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 306 days.

(21) Appl. No.: 17/597,742

(22) PCT Filed: Sep. 25, 2019

(86) PCT No.: PCT/CN2019/107672
§ 371 (c)(1),
(2) Date: Jan. 21, 2022

(87) PCT Pub. No.: WO2021/056229
PCT Pub. Date: Apr. 1, 2021

(65) Prior Publication Data
US 2022/0259798 A1  Aug. 18, 2022

(51) Int. Cl.
*D06N 3/14* (2006.01)
*D06N 3/00* (2006.01)

(52) U.S. Cl.
CPC ........... *D06N 3/147* (2013.01); *D06N 3/0043* (2013.01); *D06N 2211/28* (2013.01)

(58) Field of Classification Search
CPC .. C08G 18/4829; C08G 18/10; C08G 18/242; C08G 18/4072; C08G 18/4825;
(Continued)

(56) References Cited

U.S. PATENT DOCUMENTS 9,574,072 B2   2/2017  Yun et al.
2004/0259968 A1  12/2004  Krebs et al.
(Continued)

FOREIGN PATENT DOCUMENTS

CN   105350342   2/2016
CN   105386327   3/2016
(Continued)

OTHER PUBLICATIONS

Liuliu, Influence of Water Based Polyurethane Foaming Ratio on Synthetic Leather Coating Properties, vol. 47, No. 7.
(Continued)

*Primary Examiner* — Camie S Thompson

(57) ABSTRACT

A non-solvent two-component polyurethane artificial leather composition is provided. The polyurethane composition comprises (A) a polyurethane-prepolymer component, comprising one or more polyurethane-prepolymers prepared by reacting at least one polyisocyanate compound with at least one first polyol, wherein the polyurethane-prepolymer comprises at least two free isocyanate groups; and (B) a polyol component, comprising at least one second polyol; wherein the polyol component further comprises an encapsulated foaming agent comprising at least one foaming core phase encapsulated within an outer shell. The polyurethane leather product derived from the polyurethane composition exhibits enhanced stability, mild bubble generation and improved cost effectiveness. A polyurethane leather product prepared with said composition and the method for preparing the same are also provided.

15 Claims, 2 Drawing Sheets

(58) Field of Classification Search
CPC .. C08G 18/4841; C08G 18/632; C08G 18/48; C08G 18/63; C08G 18/40; C08G 2110/0008; D06N 2211/28; D06N 2205/08; D06N 3/14; D06N 3/0095; D06N 3/0068; D06N 3/005; D06N 3/0043; D06N 3/147; C08J 9/32; C08J 2375/04; C08J 2203/22
USPC .......................................................... 442/394
See application file for complete search history.

(56) References Cited

U.S. PATENT DOCUMENTS

| | | |
|---|---|---|
| 2005/0020706 A1 | 1/2005 | Kollbach et al. |
| 2007/0129456 A1 | 6/2007 | Cha et al. |
| 2010/0028650 A1 | 2/2010 | Kusakawa et al. |
| 2016/0002444 A1 | 1/2016 | Yun et al. |
| 2016/0115290 A1 | 4/2016 | Svedberg et al. |

FOREIGN PATENT DOCUMENTS

| | | | |
|---|---|---|---|
| CN | 106049079 | | 10/2016 |
| CN | 106142564 | * | 11/2016 |
| CN | 205934544 | | 2/2017 |
| CN | 107722339 | | 2/2018 |
| JP | 2010137264 | | 11/2012 |
| JP | 2013010925 | A | 1/2013 |
| KR | 1556865 | | 10/2015 |
| WO | 2014198532 | A1 | 12/2014 |

OTHER PUBLICATIONS

Office Action from corresponding Chinese Patent Application: 201980100243.3 with a mailing date of Sep. 8, 2023.
Office Action from corresponding Japanese Patent Application: 2022-514724 with a mailing date of Sep. 19, 2023.
Search report from corresponding European 19946360.5 application, dated Apr. 19, 2023.
Office Action from corresponding Chinese 201980100243.3 application, dated Mar. 20, 2023.

* cited by examiner

Control Example

Inventive Example 1

Inventive Example 2

Inventive Example 3

Inventive Example 4

NON-SOLVENT 2K POLYURETHANE ARTIFICIAL LEATHER COMPOSITION, ARTIFICIAL LEATHER PREPARED WITH SAME AND PREPARATION METHOD THEREOF

FIELD OF THE INVENTION

The present disclosure relates to a non-solvent two-component (2K) polyurethane artificial leather composition, an artificial polyurethane leather product prepared by using the composition and a method for preparing the artificial polyurethane leather product. The artificial polyurethane leather product exhibits enhanced stability, mild bubble generation and improved cost effectiveness.

BACKGROUND TECHNOLOGY

Currently, most Polyurethane (PU) artificial leathers are made using volatile organic solvents such as dimethylformamide (DMF), methylethyl ketone (MEK) and toluene. These solvent-based systems bring about environmental issues due to the vaporization of the organic solvent during manufacture process and the existence of residual organic solvent in the leather products, hence there is an ever increasing demand for environmentally friendly PU leather products. Recently, under government pushing and end user (Brand owners) pulling, environmentally friendly PU artificial leather technologies are growing very quickly. Attempts have been made to minimize the use of volatile organic solvents in the manufacturing of PU artificial leather. There are several new Ecologically Friendly (ECO) technologies in this market, such as 2K (two-component) non-solvent PU foam technology, PUD (polyurethane dispersion) foam technology and TPU foam technology. 2K non-solvent PU foam is one of the most popular technologies for its advantages such as cost effectiveness and flexibility in formulation. Foaming refers to a step for generating bubbles in PU leather film and is rather important in artificial leather application for achieving the advantages of e.g. lower cost, better hand feeling, improved embossing, enhanced gas migration, etc. The normal foaming technology used for manufacturing the 2K non-solvent PU artificial leather is known as "moisture foaming", i.e. reacting isocyanate with water or water vapor to generate $CO_2$ for bubbling and foaming the PU artificial leather. Nevertheless, the moisture foaming technology has some weaknesses. First of all, the mechanism of this foaming technology mainly relies on the reaction of water with isocyanate, wherein isocyanate, which is also a raw material for preparing the polyurethane, will be consumed, thus increasing the manufacture cost. Secondly, additional additives have to be incorporated into the polyurethane system to stabilize the bubbles thus formed, which also increases the manufacture cost. Thirdly, it is difficult to control the reaction between water and isocyanate, thus increasing the complexity in the manufacture and routine maintenance. For the above reasons, there is still a need in the polyurethane manufacture industry to develop a polyurethane composition whose performance properties as stated above can be improved with an economical way.

After persistent exploration, the inventors have surprisingly developed a polyurethane composition which can achieve one or more of the above targets. In particular, it was found that when an encapsulated foaming agent is used for manufacturing a 2K non-solvent PU artificial leather product, no isocyanate raw material will be wasted for bubbling, no surfactant need to be used to stabilize the bubbles, the formation of polyurethane chain will not be influenced by the foaming step, and the resultant PU leather product exhibits better hand feeling.

SUMMARY OF THE INVENTION

The present disclosure provides a unique non-solvent two-component polyurethane artificial leather composition, an artificial polyurethane leather product prepared by using the composition and a method for preparing the artificial polyurethane leather product.

In a first aspect of the present disclosure, the present disclosure provides a non-solvent two-component polyurethane artificial leather composition comprising (A) a polyurethane-prepolymer component, comprising one or more polyurethane-prepolymers prepared by reacting at least one polyisocyanate compound with at least one first polyol, wherein the polyurethane-prepolymer comprises at least two free isocyanate groups; and (B) a polyol component, comprising at least one second polyol; wherein the polyol component further comprises an encapsulated foaming agent comprising at least one foaming core phase encapsulated within an outer shell.

In a second aspect of the present disclosure, the present disclosure provides a method for preparing an artificial polyurethane leather product by using the composition of the present disclosure, comprising the steps of i) reacting the polyisocyanate compound with the first polyol to form the polyurethane-prepolymer component (A) comprising one or more polyurethane-prepolymers, wherein the polyurethane-prepolymer has at least two free isocyanate terminal groups; ii) mixing the polyurethane-prepolymer component (A) with the polyol component (B) to form a precursor mixture; iii) applying the precursor mixture onto one surface of a releasing film to form a green layer; iv) optionally applying a carrier layer onto a surface of the green layer opposite to the releasing film; iv) heating the green layer to form a foamed polyurethane leather layer; and v) optionally, peeling off the foamed polyurethane leather layer from the releasing film.

In a third aspect of the present disclosure, the present disclosure provides an artificial polyurethane leather product prepared by the above method, wherein the product comprises a foamed polyurethane leather layer, an optional releasing film and an optional carrier layer.

It is to be understood that both the foregoing general description and the following detailed description are exemplary and explanatory only and are not restrictive of the invention, as claimed.

DETAILED DESCRIPTION OF THE INVENTION

Figure 1:
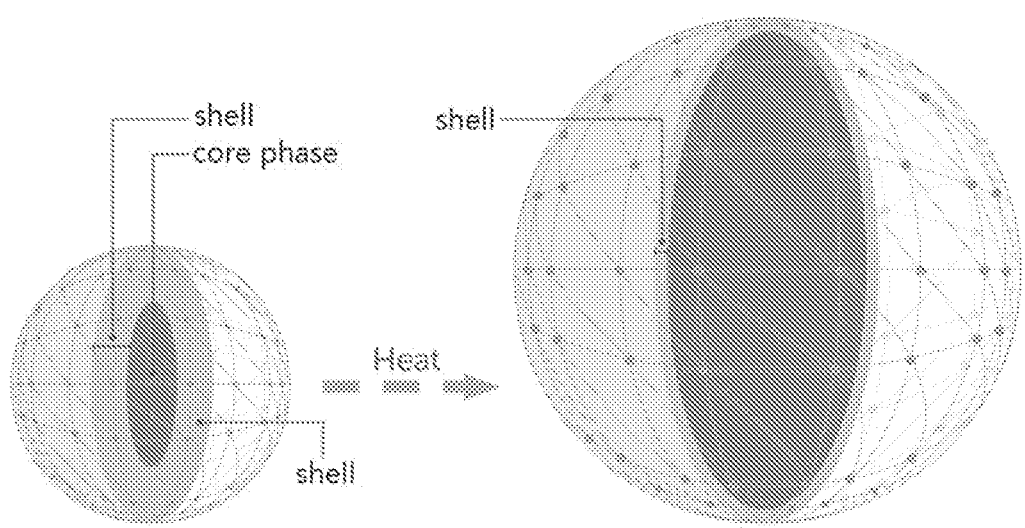
FIG. 1 is a schematic illustration of an exemplary encapsulated foaming agent.

Unless defined otherwise, all technical and scientific terms used herein have the same meaning as commonly understood by one of ordinary skill in the art to which the invention belongs. Also, all publications, patent applications, patents, and other references mentioned herein are incorporated by reference.

As disclosed herein, the term "composition", "formulation" or "mixture" refers to a physical blend of different components, which is obtained by mixing simply different components via a physical means.

As disclosed herein, "and/or" means "and, or as an alternative". All ranges include endpoints unless otherwise indicated. Unless indicated otherwise, all the percentages and ratios are calculated based on weight, and all the molecular weights are number average molecular weights.

In the context of the present disclosure, the term "two component (2K) polyurethane artificial leather composition" refers to a composition comprising two components which may react with each other to produce the polyurethane artificial leather. According to an embodiment of the present disclosure, the polyurethane composition is a "two-component", "two-part" or "two-package" composition comprising a polyurethane-prepolymer component (A) and a polyol component (B), wherein the polyurethane-prepolymer component (A) comprises at least one polyurethane-prepolymer having at least two free isocyanate terminal groups. The polyurethane-prepolymer component (A) and the polyol component (B) are transported and stored separately, combined shortly or immediately before being applied during the manufacture of the polyurethane product, such as artificial leather. Once combined, the isocyanate groups in component (A) reacts with the hydroxyl group and any additional isocyanate-reactive groups (if any, e.g. amine group, thiol group, carboxyl group, etc.) in component (B) to form polyurethane. Without being limited to any specific theory, it is believed that the incorporation of at least one encapsulated foaming agent in the preparation system can effectively improve the foaming procedure, thus improving the performance properties of the resultant polyurethane foam in a cost-efficient way.

The Polyurethane-Prepolymer Component (A)

According to a preferable embodiment of the present disclosure, the polyurethane-prepolymer is prepared by reacting an excessive amount of monomeric polyisocyanate with a monomeric or polymeric polyol.

In various embodiments, the polyisocyanate compound for preparing the polyurethane-prepolymer is an aliphatic, cycloaliphatic, aromatic or heteroaryl compound having at least two isocyanate groups. In a preferable embodiment, the polyisocyanate compound can be selected from the group consisting of $C_4$-$C_{12}$ aliphatic polyisocyanates comprising at least two isocyanate groups, $C_6$-$C_{15}$ cycloaliphatic or aromatic polyisocyanates comprising at least two isocyanate groups, $C_7$-$C_{15}$ aliphatic polyisocyanates comprising at least two isocyanate groups, and combinations thereof. In another preferable embodiment, suitable polyisocyanate compounds include m-phenylene diisocyanate, 2,4-toluene diisocyanate and/or 2,6-toluene diisocyanate (TDI), the various isomers of diphenylmethanediisocyanate (MDI), carbodiimide modified MDI products, hexamethylene-1,6-diisocyanate, tetramethylene-1,4-diisocyanate, cyclohexane-1,4-diisocyanate, hexahydrotoluene diisocyanate, hydrogenated MDI, naphthylene-1,5-diisocyanate, isophorone diisocyanate (IPDI), or mixtures thereof. Generally, the amount of the polyisocyanate compound may vary based on the actual requirement of the polyurethane foam and the polyurethane artificial leather. For example, as one illustrative embodiment, the content of the polyisocyanate compound can be from 15 wt % to 60 wt %, or from 20 wt % to 50 wt %, or from 23 wt % to 40 wt %, or from 25 wt % to 38 wt %, based on the total weight of the polyurethane composition.

According to one embodiment of the present disclosure, the first polyol for preparing the polyurethane-prepolymer can be selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, polyester polyols having a molecular weight from 100 to 5,000 and an average hydroxyl functionality of 1.5 to 5.0, a polyether polyol which is a poly($C_2$-$C_{10}$)alkylene glycol or a copolymer of multiple ($C_2$-$C_{10}$)alkylene glycols having a molecular weight from 100 to 5,000, polycarbonate diols having a molecular weight from 100 to 5,000, $C_2$ to $C_{10}$ polyamine comprising at least two amino groups, $C_2$ to $C_{10}$ polythiol comprising at least two thiol groups, $C_2$-$C_{10}$ alkanolamine comprising at least one hydroxyl group and at least one amino groups, and combinations thereof. According to a preferable embodiment, the first polyol is a polyether polyol. In various embodiments, the polyether polyol used as the first polyol has a molecular weight of 100 to 5,000 g/mol, and may have a molecular weight in the numerical range obtained by combining any two of the following end point values: 120, 150, 180, 200, 250, 300, 350, 400, 450, 500, 550, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900 and 5000 g/mol. In various embodiments, the polyether polyol used as the first polyol has an average hydroxyl functionality of 1.5 to 5.0, and may have an average hydroxyl functionality in the numerical range obtained by combining any two of the following end point values: 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9 and 5.0. According to a preferable embodiment of the present disclosure, the polyether polyol is selected from the group consisting of polyethylene glycol, polypropylene glycol, polytetramethylene glycol, poly(2-methyl-1,3-propane glycol) and any copolymers thereof, such as poly(ethylene oxide-propylene oxide) glycol. According to another preferable embodiment of the present disclosure, the polyether polyol may comprise at least one poly($C_2$-$C_{10}$)alkylene glycol or copolymer thereof, for example, the polyether polyol may be selected from the group consisting of polyethylene, (methoxy)polyethylene glycol (MPEG), polyethylene glycol (PEG), poly(propylene glycol), polytetramethylene glycol, poly(2-methyl-1,3-propane glycol) or copolymer of ethylene epoxide and propylene epoxide (polyethylene glycol-propylene glycol) with primary hydroxyl ended group or secondary hydroxyl ended group.

According to an embodiment of the present disclosure, the polyether polyols can be prepared by polymerization of one or more linear or cyclic alkylene oxides selected from propylene oxide (PO), ethylene oxide (EO), butylene oxide, tetrahyfrofuran, 2-methyl-1,3-propane glycol and mixtures thereof, with proper starter molecules in the presence of a catalyst. Typical starter molecules include compounds having at least 1, preferably from 1.5 to 3.0 hydroxyl groups or having one or more primary amine groups in the molecule. Suitable starter molecules having at least 1 and preferably from 1.5 to 3.0 hydroxyl groups in the molecules are for example selected from the group comprising ethylene glycol, 1,2-propanediol, 1,3-propanediol, 1,2-butanediol, 1,3- butanediol, 1,4-butenediol, 1,4-butynediol, 1,5-pentanediol, neopentyl glycol, 1,4-bis(hydroxymethyl)-cyclohexane, 1,2-bis(hydroxymethyl)cyclohexane, 1,3-bis(hydroxymethyl)-cyclohexane, 2-methylpropane-1,3-diol, methylpentanediols, diethylene glycol, triethylene glycol, tetraethylene glycol, polyethylene glycol, dipropylene glycol, polypropylene glycol, dibutylene glycol, polybutylene glycols, trimethylolpropane, glycerol, pentaerythritol, castor oil, sugar compounds such as, for example, glucose, sorbitol, mannitol and sucrose, polyhydric phenols, resols, such as oligomeric condensation products of phenol and formaldehyde and Mannich condensates of phenols, formaldehyde and dialkanolamines, and also melamine. Starter molecules having one or more primary amine groups in the molecules may be selected for example from the group consisting of aniline, EDA, TDA, MDA and PMDA, more preferably from the group comprising TDA and PMDA, an most preferably TDA. When TDA is used, all isomers can be used alone or in any desired mixtures. For example, 2,4-TDA, 2,6-TDA, mixtures of 2,4-TDA and 2,6-TDA, 2,3-TDA, 3,4-TDA, mixtures of 3,4-TDA and 2,3-TDA, and also mixtures of all the above isomers can be used. Catalysts for the preparation of polyether polyols may include alkaline catalysts, such as potassium hydroxide, for anionic polymerization or Lewis acid catalysts, such as boron trifluoride, for cationic polymerization. Suitable polymerization catalysts may include potassium hydroxide, cesium hydroxide, boron trifluoride, or a double cyanide complex (DMC) catalyst such as zinc hexacyanocobaltate or quaternary phosphazenium compound. In a preferable embodiment of the present disclosure, the starting material polyether polyol includes polyethylene, (methoxy)polyethylene glycol (MPEG), polyethylene glycol (PEG), poly(propylene glycol), polytetramethylene glycol, poly(2-methyl-1,3-propane glycol) or copolymer of ethylene epoxide and propylene epoxide (polyethylene glycol-propylene glycol) with primary hydroxyl ended group or secondary hydroxyl ended group.

According to one preferable embodiment, the first polyol exclusively comprises one or more polyether polyol as stated above. According to one preferable embodiment, the first polyol further comprises one or more polyol as stated above other than the polyether polyol.

According to a preferable embodiment of the present disclosure, the amount of the polyisocyanate compound is properly selected so that the isocyanate group is present at a stoichiometric molar amount relative to the total molar amount of the hydroxyl groups included in the first polyol, the second polyol, and any additional additives or modifiers. According to an embodiment of the present disclosure, the polyurethane-prepolymer has a NCO content of from 2 to 50 wt %, preferably from 6 to 49 wt %, preferably from 8 to 25 wt %, preferably from 10 to 20 wt %, more preferably from 11 to 15 wt %, most preferably from 12 to 13 wt %. According to an embodiment of the present disclosure, the polyurethane-prepolymer has a viscosity (average kinematic viscosity) of from 50 cSt to 10,000 cSt, or from 100 cSt to 9,000 cSt, or from 300 cSt to 8,500 cSt, or from 500 cSt to 8,000 cSt, or from 500 cSt to 5,000 cSt, or from 1,000 cSt to 7,000 cSt, or from 2,000 cSt to 6,000 cSt, or from 3,000 cSt to 5,000 cSt, or from 500 cSt to 5,000 cSt.

According to a preferable embodiment of the present disclosure, component (A) solely comprises one polyurethane-prepolymer. According to another preferable embodiment of the present disclosure, component (A) is a blend of two or more polyurethane-prepolymers which are different from each other in formulation, such as categories and relative contents of polyisocyanate and first polyol.

The reaction between the polyisocyanate compound and the first polyol may occur in the presence of one or more catalysts that can promote the reaction between the isocyanate group and the hydroxyl group. Without being limited to theory, the catalysts can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof. Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis (2-dimethylaminoethyl)ether, triethylamine, tripropylamine, tributyl-amine, triamylamine, pyridine, quinoline, dimethylpiperazine, piperazine, N-ethylmorpholine, 2-methylpropanediamine, methyltriethylenediamine, 2,4,6-tridimethyl-amino-methyl)phenol, N,N',N"-tris(dimethyl amino-propyl) sym-hexahydro triazine, or mixtures thereof.

In general, the content of the catalyst used herein is larger than zero and is at most 3.0 wt %, preferably at most 2.5 wt %, more preferably at most 2.0 wt %, based on the total weight of the component (A).

According to an alternative embodiment of the present disclosure, component (A) is a blend of one or more polyurethane-prepolymer with one or more monomeric polyisocyanate, wherein the monomeric polyisocyanate is selected from those used for preparing the polyurethane-prepolymer.

The Polyol Component (B)

In various embodiments of the present disclosure, the polyol component (B) comprises one or more second polyol which can be identical with or different from the first polyol for preparing the polyurethane-prepolymer. According to a preferable embodiment of the present application, the second polyol selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, polyester polyols having a molecular weight from 100 to 5,000 and an average hydroxyl functionality of 1.5 to 5.0, a polyether polyol which is a poly($C_2$-$C_{10}$)alkylene glycol or a copolymer of multiple ($C_2$-$C_{10}$)alkylene glycols having a molecular weight from 100 to 5,000, polycarbonate diols having a molecular weight from 100 to 5,000, $C_2$-$C_{10}$ alkanolamine comprising at least one hydroxyl group and at least one amino groups, and combinations thereof. According to one embodiment of the present application, the second polyol is a blend of a polymeric polyol (such as one or more of the polyester polyol, the polyether polyol, the polycarbonate diol and polyester-polyether copolymeric polyol) and a monomeric polyol (such as one or more of the $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, $C_2$-$C_{10}$ alkanolamine comprising at least one hydroxyl group and at least one amino groups). According to another embodiment of the present application, the second polyol is a blend of a polyester polyol and a polyether polyol.

The reaction between the polyurethane-prepolymer component (A) and the polyol component (B) may occur in the presence of one or more catalysts, said catalyst can be identical with or different from that used for preparing the polyurethane-prepolymer. For example, the catalyst used for catalyzing the reaction between component (A) and component (B) can include, for example, glycine salts; tertiary amines; tertiary phosphines, such as trialkylphosphines and dialkylbenzylphosphines; morpholine derivatives; piperazine derivatives; chelates of various metals, such as those which can be obtained from acetylacetone, benzoylacetone, trifluoroacetyl acetone, ethyl acetoacetate and the like with metals such as Be, Mg, Zn, Cd, Pd, Ti, Zr, Sn, As, Bi, Cr, Mo, Mn, Fe, Co and Ni; acidic metal salts of strong acids such as ferric chloride and stannic chloride; salts of organic acids with variety of metals, such as alkali metals, alkaline earth metals, Al, Sn, Pb, Mn, Co, Ni and Cu; organotin compounds, such as tin(II) salts of organic carboxylic acids, e.g., tin(II) diacetate, tin(II) dioctanoate, tin(II) diethylhexanoate, and tin(II) dilaurate, and dialkyltin(IV) salts of organic carboxylic acids, e.g., dibutyltin diacetate, dibutyltin dilaurate, dibutyltin maleate and dioctyltin diacetate; bismuth salts of organic carboxylic acids, e.g., bismuth octanoate; organometallic derivatives of trivalent and pentavalent As, Sb and Bi and metal carbonyls of iron and cobalt; or mixtures thereof. Tertiary amine catalysts include organic compounds that contain at least one tertiary nitrogen atom and are capable of catalyzing the hydroxyl/isocyanate reaction. The tertiary amine, morpholine derivative and piperazine derivative catalysts can include, by way of example and not limitation, triethylenediamine, tetramethylethylenediamine, pentamethyl-diethylene triamine, bis(2-dimethyl-aminoethyl)-ether, triethylamine, tripropylamine, tributylamine, triamylamine, pyridine, quinoline, dimethylpiperazine, piperazine, N-ethylmorpholine, 2-methylpropanediamine, methyl-triethylenediamine, 2,4,6-tridimethylamino-methyl)phenol, N,N',N"-tris(dimethyl amino-propyl)sym-hexahydro triazine, or mixtures thereof.

In general, the content of the catalyst used herein is larger than zero and is at most 3.0 wt %, preferably at most 2.5 wt %, more preferably at most 2.0 wt %, based on the total weight of the polyurethane composition.

In the present application, the terms "foaming agent" and "blowing agent" are used interchangeably and represent a reagent which may impart the resultant PU artificial leather product with an inner porous structure. The terms "encapsulated foaming agent", "encapsulated blowing agent" and "microsphere foaming agent" are used interchangeably and represent a foaming agent having a core-shell structure.

According to various embodiments of the present disclosure, an encapsulated foaming agent is present during the reaction between component (A) and component (B) to achieve a mild and smooth foaming progress. FIG. 1 is a schematic illustration of an exemplary encapsulated foaming agent. As shown in FIG. 1, the encapsulated foaming agent comprises a core phase encapsulated within a shell. The shell preferably encapsulates the whole surface of the core phase. According alternative embodiments of the present application, the encapsulated foaming agent comprises multiple cores and/or multiple shells, wherein the formulation and/or dimensions of each core and/or shell may be identical with each other or different from each other.

According to one embodiment of the present disclosure, the core phase comprises at least one foaming compound (also known as foaming core compound) selected from the group consisting of $C_3$-$C_{16}$ aliphatic hydrocarbon optionally substituted with at least one chlorine atom and/or fluorine atom, $C_6$-$C_{16}$ cycloaliphatic or aromatic hydrocarbon optionally substituted with at least one chlorine atom and/or fluorine atom, $C_2$ to $C_{16}$ ether compound optionally substituted with at least one chlorine atom and/or fluorine atom, tetra($C_1$-$C_6$ alkyl)silane, tetra($C_1$-$C_6$ alkoxy)silicon, water, carbonamide compound, hydrazide, polyamine, nitrile, carboxylate salt, bicarbonate salt, organic sulfate salt, carbon dioxide, carbon monoxide, and combinations thereof. According to a preferable embodiment of the present disclosure, the foaming compound within the core phase comprises at least one member selected from the group consisting of propane, butane, pentane, cyclopentane, trichlorofluoromethane, dichlorodifluoromethane, 1,1-dichlorofluoroethane, dichlorotrifluoroethane, dichloro-difluoroethane, dichlorotetrafluoroethane, trichlorotrifluoroethane, 1,1,1,3,3-pentafluoro-propane, perfluoropropane, water, azodicarbonamide, benzene-sulfonyl hydrazide, dinitroso-pentamethylene tetramine, toluenesulfonyl hydrazide, azobisisobutyronitrile, barium azodicarboxylate, sodium bicarbonate, potassium bicarbonate, ammonium bicarbonate, iron bicarbonate, sodium dodecyl sulfate, nitrogen, carbon dioxide, carbon monoxide, and combinations thereof.

The shell comprises or consists of at least one member selected from the group consisting of acrylic resin, phenolic resin, alkyd resin, polyester resin, amino resin, epoxy resin, copolymers thereof and blends thereof. According to an embodiment of the present disclosure, the outer shell comprises homopolymer or copolymer formed by at least one monomer selected from the group consisting of acrylonitrile, methacrylonitrile, α-chloroacrylonitrile, α-ethoxyacrylonitrile, fumaronitrile, methacrylic acid, itaconic acid, maleic acid, fumaric acid, citraconic acid, vinyl chloride, vinylidene chloride, vinyl bromide, vinyl fluoride, vinyl acetate, vinyl propionate, vinyl butyrate, methyl (meth)acrylate, ethyl (meth)acrylate, propyl (meth)acrylate, n-butyl (meth)acrylate, isobutyl (meth)acrylate, t-butyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, isobonyl (meth)acrylate, cyclohexyl (meth)acrylate, benzyl (meth)acrylate, β-carboxyethyl (meth)acrylate, 2-hydroxyethyl (meth)acrylate, 2-hydroxypropyl (meth)acrylate, styrene, methylstyrene, ethylstyrene, dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, n-methoxystyrene, p-phenylstyrene, p-chlorostyrene, 3,4-dichlorostyrenechlorostyrene, acrylamide, methacrylamide, N-phenyl maleimide, N-(2-chlorophenyl) maleimide, N-cyclohexyl maleimide, N-laurylmaleimide, ethylene, propylene, butylenes, isobutylene, vinylmethylether, vinylethylether, vinylisobutylether, vinylmethylketone, vinylhexylketone, methylisopropenyllketone, N-vinylpyrrole, N-vinylcarbazole, N-vinylindole, N-vinylpyrrolidone, allyl methacrylate, ethylene glycol dimethacrylate, diethylene glycol dimethacrylate, triethylene glycol dimethacrylate, polyethylene glycol dimethacrylate, trimethyloipropane trimethacrylate, pentaerithrityl tetramethacrylate, bis(metacryloyloxymethyl)tricyclodecane, and blends thereof. According to a preferable embodiment of the present disclosure, the shell comprises or consist of an acrylic resin, preferably a rigid acrylic resin.

According to an embodiment of the present disclosure, the encapsulated foaming agent is incorporated in the reaction system between component (A) and component (B) under an "unexpanded" stated, then it expands under the as the reaction proceeds under a temperature of e.g. from 60° C. to 300° C., preferably from 70° C. to 250° C., more preferably from 75 to 240° C., and most preferably from 80° C. to 235° C. to form pores within the resultant polyurethane. For example, the temperature at which the encapsulated foaming agent starts to expand, which is also known as "starting temperature" or "expansion starting temperature", can be 80° C., 82° C., 84° C., 85° C., 88° C., 90° C., 92° C., 94° C., 95° C., 96° C., 98° C., 100° C., 102° C., 104° C., 105° C., 106° C., 108° C., 110° C., 115° C., 118° C., 120° C., 122° C., 125° C., 127° C., 130° C., 132° C., 134° C., 135° C., 137° C., 139° C., 140° C., 142° C., 144° C., 145° C., 147° C., 148° C., 149° C., 150° C., or can be within a temperature range obtained by combining any two of the above values. The maximum temperature during the reaction depends on factors such as the reaction activity/rate as well as the heating/cooling/thermal recycling mechanism, and can be 120° C., 125° C., 128° C., 130° C., 132° C., 135° C., 138° C., 140° C., 142° C., 144° C., 145° C., 146° C., 148° C., 150° C., 152° C., 155° C., 158° C., 160° C., 162° C., 165° C., 168° C., 170° C., 172° C., 175° C., 178° C., 180° C., 182° C., 185° C., 188° C., 190° C., 192° C., 195° C., 198° C., 200° C., 202° C., 205° C., 208° C., 210° C., 212° C., 215° C., 218° C., 220° C., 222° C., 225° C., 228° C., 230° C., 232° C., 235° C., 238° C., 240° C., 242° C., 245° C., 248° C., 250° C., 252° C., 255° C., 258° C., 260° C., 262° C., 265° C., 268° C., 270° C., 272° C., 275° C., 277° C., 280° C., 282° C., 285° C., 288° C., 290° C., 292° C., 295° C., 298° C., 300° C., or can be within a temperature range obtained by combining any two of the above values, with the proviso that the maximum temperature is higher than the starting temperature.

According to an embodiment of the present disclosure, the encapsulated foaming agent has a low density under unexpanded state of no higher than 40 kg/m$^3$, or no higher than 38 kg/m$^3$, or no higher than 35 kg/m$^3$, or no higher than 32 kg/m$^3$, or no higher than 30 kg/m$^3$, or no higher than 28 kg/m$^3$, or no higher than 26 kg/m$^3$, or no higher than 25 kg/m$^3$, or no higher than 23 kg/m$^3$, or no higher than 22 kg/m$^3$, or no higher than 20 kg/m$^3$, or no higher than 18 kg/m$^3$, or no higher than 16 kg/m$^3$, or no higher than 15 kg/m$^3$, or no higher than 12 kg/m$^3$, or no higher than 10 kg/m$^3$, or no higher than 8 kg/m$^3$, or no higher than 7 kg/m$^3$, or no higher than 6 kg/m$^3$, or no higher than 5 kg/m$^3$.

According to an embodiment of the present disclosure, the encapsulated foaming agent has a particle size under unexpanded state of 5 μm, or 7 μm, or 8 μm, or 9 μm, or 10 μm, or 12 μm, or 14 μm, or 15 μm, or 17 μm, or 19 μm, or 20 μm, or 22 μm, or 24 μm, or 25 μm, or 27 μm, or 30 μm, or 32 μm, or 34 μm, or 35 μm, or 37 μm, or 39 μm, or 40 μm, or can be within a numerical range obtained by combining any two of the above values. According to an embodiment of the present disclosure, the outer shell of the encapsulated foaming agent has a thickness under unexpanded state of 0.02 μm, or 0.05 μm, or 0.08 μm, or 0.1 μm, or 0.2 μm, or 0.5 μm, or 0.8 μm, or 1 μm, or 2 μm, or 3 μm, or 4 μm, or 5 μm, or 6 μm, or 7 μm, or 8 μm, or 9 μm, or 10 μm, or 11 μm, or 12 μm, or can be within a numerical range obtained by combining any two of the above values.

FIG. 1 shows the expansion of the encapsulated foaming agent under thermal treatment, wherein the diameter of the encapsulated foaming agent may increase to 1.2 times, or 1.5 times, or 1.7 times, or 1.9 times, or 2.0 times, or 2.2 times, or 2.5 times, or 2.8 times, or 3.0 times, or 3.2 times, or 3.5 times, or 3.8 times, or 4.0 times, or 4.2 times, or 4.5 times, or 4.8 times, or 5.0 times, or 5.2 times, or 5.5 times, or 5.8 times, or 6.0 times, or 6.5 times, or 6.8 times, or 7.0 times, or 7.2 times, or 7.5 times, or 7.8 times, or 8.0 times, or 8.2 times, or 8.5 times, or 8.8 times, or 9.0 times, or 9.2 times, or 9.5 times, or 9.8 times, or 10 times, of the original diameter of the unexpanded encapsulated foaming agent. Such an expansion may be caused by a physical process (thermal expansion, evaporation, sublimation, etc.), a chemical process (degradation, gas generation, etc.), or a combination thereof. The thickness of the shell will decrease as the expansion proceeds. According to an embodiment of the present application, the shell retains intact during the expansion stage so that no foaming agent within the core is leaked and contact with said component (A) or the second polyol, hence the formation of porosity mainly relies on the expansion and the pore structure within the PU product is substantially closed pore.

In an alternative embodiment of the present disclosure, part of the shell of the encapsulated foaming agent, e.g. the shell of about 5%, 7%, 9%, 10%, 12%, 15%, 17%, 19%, 20%, 22%, 25%, 27%, 29%, 30%, 32%, 35%, 37%, 40%, 42%, 45%, 48%, 50%, 52%, 55%, 58%, 60%, 62%, 65%, 68%, 70%, 72%, 75%, 78%, 80%, 82%, 85%, 88%, 90%, 92%, 95%, 98% or 100% of the encapsulated foaming agent breaks during the expansion stage, thus the foaming agent leaks out of the shell and contacts with the polyurethane-prepolymer, second polyol or any other additives/adjuvants within the system to further generate foam and porous structure. Under such a circumstance, the porous structure is derived from a combination of the expansion of core-shell foaming agent and the physical/chemical action of the leaked core foaming agent.

According to an embodiment of the present disclosure, the content of the encapsulated foaming agent is from 0.1 wt % to 30 wt %, more preferably from 0.1 wt % to 10 wt %, more preferably from 2 wt % to 7 wt %, more preferably from 2.3 wt % to 6.2 wt %, and most preferably from 2.5 wt % to 3.5 wt %, based on the total weight of the polyol component (B).

According to an embodiment of the present disclosure, the encapsulated foaming agent is combined with the second polyol before the reaction of the component (A) and the component (B). According to an alternative embodiment of the present disclosure, the encapsulated foaming agent, the second polyol, and any other ingredients for the component (B) are independently blended with the component (A), but all of them are still considered as ingredients of the component (B).

According to a preferable embodiment of the present disclosure, the non-solvent two-component polyurethane artificial leather composition of the present disclosure exclusively comprise the encapsulated foaming agent and does not comprise any other foaming agent. According to various embodiments of the present disclosure, the non-solvent two-component polyurethane artificial leather composition of the present disclosure preferably does not comprise any foam stabilizer.

Additives

In various embodiments of the present disclosure, the non-solvent two-component polyurethane composition comprises one or more additives selected from the group consisting of chain extenders, crosslinkers, blowing agents other than the encapsulated foaming agent, foam stabilizers, tackifiers, plasticizers, rheology modifiers, antioxidants, fillers, colorants, pigments, water scavengers, surfactants, solvents, diluents, flame retardants, slippery-resistance agents, antistatic agents, preservatives, biocides, antioxidants and combinations of two or more thereof. These additives can be transmitted and stored as independent components and incorporated into the polyurethane composition shortly or immediately before the combination of components (A) and (B). Alternatively, these additives may be contained in either of components (A) and (B) when they are chemically inert to the isocyanate group or the isocyanate-reactive (hydroxyl) group.

According to an embodiment of the present disclosure, one or more bubble controlling agent and bubble stabilizers may be included in the non-solvent two-component polyurethane composition.

A chain extender may be present in the reactants that form the polyurethane foam. A chain extender is a chemical having two isocyanate-reactive groups per molecule and an equivalent weight per isocyanate-reactive group of less than 300, preferably less than 200 and especially from 31 to 125. The isocyanate reactive groups are preferably hydroxyl, primary aliphatic or aromatic amino or secondary aliphatic or aromatic amino groups. Representative chain extenders include ethylene glycol, diethylene glycol, triethylene glycol, 1,2-propylene glycol, dipropylene glycol, tripropylene glycol, 1,4-butanediol, cyclohexane dimethanol, ethylene diamine, phenylene diamine, bis(3-chloro-4-aminophenyl) methane, dimethylthio-toluenediamine and diethyltoluene-diamine.

One or more crosslinkers also may be present in the reactants that form the polyurethane foam. For purposes of this invention, "crosslinkers" are materials having three or more isocyanate-reactive groups per molecule and an equivalent weight per isocyanate-reactive group of less than 300. Crosslinkers preferably contain from 3 to 8, especially from 3 to 4 hydroxyl, primary amine or secondary amine groups per molecule and have an equivalent weight of from 30 to about 200, especially from 50 to 125. Examples of suitable crosslinkers include diethanol amine, monoethanol amine, triethanol amine, mono-, di- or tri(isopropanol) amine, glycerine, trimethylol propane, pentaerythritol, and the like.

Chain extenders and crosslinkers are suitably used in small amounts, as hardness increases as the amount of either of these materials increases. From 0 to 25 parts by weight of a chain extender is suitably used per 100 parts by the combined weight of the first polyol and second polyol. A preferred amount is from 1 to 15 parts per 100 parts by the combined weight of the first polyol and second polyol. From 0 to 10 parts by weight of a crosslinker is suitably used per 100 parts by the combined weight of the first polyol and second polyol. A preferred amount is from 0 to 5 parts per 100 parts by the combined weight of the first polyol and second polyol.

A filler may be present in the polyurethane composition. Fillers are mainly included to reduce cost. Particulate rubbery materials are especially useful fillers. Such a filler may constitute from 1 to 50% or more of the weight of the polyurethane composition.

Additional foaming agents other than the encapsulated foaming agent include water, air, nitrogen, argon, carbon dioxide and $C_4$-$C_8$ hydrocarbons, $C_4$-$C_8$ hydrofluorocarbons and $C_4$-$C_8$ hydrochlorofluorocarbons, all of which are not encapsulated in any shell. A surfactant may be present in the reaction mixture. A surfactant also may be useful to wet filler particles and thereby help disperse them into the reactive composition and the elastomer. Silicone surfactants are widely used for this purpose and can be used here as well. The amount of surfactant used will in general be between 0.02 and 1 part by weight per 100 parts by the combined weight of the first and second polyols.

According a preferable embodiment of the present disclosure, the polyurethane composition is substantially free of water or moisture intentionally added therein. For example, "free of water" or "water free" means that the mixture of all the raw materials used for preparing the polyurethane composition comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of water, based on the total weight of the mixture of raw materials.

According a preferable embodiment of the present disclosure, the polyurethane composition is substantially free of any organic solvent intentionally added therein. For example, "free of organic solvent" or "organic solvent-free" means that the mixture of all the raw materials used for preparing the polyurethane composition comprise less than 3% by weight, preferably less than 2% by weight, preferably less than 1% by weight, more preferably less than 0.5% by weight, more preferably less than 0.2% by weight, more preferably less than 0.1% by weight, more preferably less than 100 ppm by weight, more preferably less than 50 ppm by weight, more preferably less than 10 ppm by weight, more preferably less than 1 ppm by weight of organic solvent, based on the total weight of the mixture of raw materials.

According a preferable embodiment of the present disclosure, the polyurethane composition is substantially free of any solvent intentionally added therein. As disclosed herein, the term "solvent" refers to organic and inorganic liquids whose function is solely dissolving one or more solid, liquid or gaseous materials without incurring any chemical reaction. In other words, although some organic compounds, e.g. ethylene glycol and propylene glycol, and water, which are generally considered as "solvent" in the polymerization technology, are used in the preparation of PU foam, none of them belongs to "solvent" since they mainly function as isocyanate-reactive functional substance, chain extending agent or foaming agent, etc. by incurring chemical reactions.

Release Layer

The releasing film is also known as a release layer, or typically known in the prior art as "release paper". Examples of suitable releasing film/release layers include foils of metal, plastic or paper. In one preferred embodiment of the present disclosure, the release layer is a paper layer optionally coated with a plastic membrane. Preferably, the paper layer disclosed herein is coated with a polyolefin, more preferably polypropylene. Alternatively, the paper layer is preferably coated with silicone. In an alternative embodiment, the release layer used herein is a PET layer optionally coated with plastic membrane. Preferably, the PET layer can be is coated with a polyolefin, more preferably polypropylene. Alternatively, the PET layer is preferably coated with silicone. Examples of suitable release layers are commercially available. The release layers used in the present disclosure may have a flat, embossed or patterned surface so that corresponding or complementary surface profile can be formed on the outermost surface of the artificial leather article. Preferably, the release layer is textured in the mode of leather grain so as to impart the artificial leather article with good haptic property comparable with that of high grade natural leather. The release layer generally has a thickness of 0.001 mm to 10 mm, preferably from 0.01 mm to 5 mm, and more preferably from 0.1 mm to 2 mm.

The material and the thickness of the release layer can be properly adjusted, as long as the release layer is able to endure the chemical reaction, mechanical processing and thermal treatments experienced during the manufacturing procedures and can be readily peeled from the resultant artificial leather without bringing about the delamination between the skin film and the 2K PU foam base layer.

Carrier Layer

In an embodiment of the present disclosure, the carrier layer is also known as a backing substrate and has a thickness of in the range from 0.01 mm to 50 mm, preferably in the range from 0.05 mm to 10 mm and more particularly in the range from 0.1 mm to 5 mm. The carrier layer may comprise one or more selected from the group consisting of fabric, preferably woven or nonwoven fabric, impregnated fabrics, knit fabric, braid fabric, or microfiber; foil of metal or plastic, e.g. rubber, PVC or polyamides; and leather, preferably split leather.

The carrier layer can be made of a woven or nonwoven textile. Preferably, the textile is a nonwoven textile. The textile may be made by any suitable method such as those known in the art. The textile may be prepared from any suitable fibrous material. Suitable fibrous materials include, but are not limited to, synthetic fibrous materials and natural or semi synthetic fibrous materials and mixtures or blends thereof. Examples of synthetic fibrous materials include polyesters, polyamides, acrylics, polyolefins, polyvinyl chlorides, polyvinylidene chlorides, polyvinyl alcohols and blends or mixtures thereof. Examples of natural semi-synthetic fibrous materials include cotton, wool and hemp.

Manufacture Technology

According to an embodiment of the present disclosure, a synthetic polyurethane leather product can be prepared by a method using the composition of the present disclosure, wherein the method comprises the steps of i) reacting the polyisocyanate compound with the first polyol to form the (A) polyurethane-prepolymer component comprising one or more polyurethane-prepolymers; ii) mixing the (A) polyurethane-prepolymer component with the (B) polyol component to form a precursor mixture; iii) applying the precursor mixture onto one surface of a releasing film to form a green layer; iv) optionally applying a carrier layer onto a surface of the green layer opposite to the releasing film; iv) heating the green layer to form a foamed polyurethane leather layer; and v) optionally, peeling off the foamed polyurethane leather layer from the releasing film.

The product thus produced comprises a foamed polyurethane leather layer, an optional releasing film and an optional carrier layer. The composition formed by combining the component (A) and the component (B) may be applied by conventional coating technologies such as spraying coating, blade coating, die coating, cast coating, etc.

In an embodiment of the present disclosure, the categories and molar contents of the polyisocyanate in component (A), the first polyol in component (A) and the second polyol are particularly selected so that the overall equivalence ratio of NCO groups to hydroxyl group is in the range from 0.9:1 to 1.8:1, preferably from 0.92:1 to 1.6:1, preferably in the range from 0.95:1 to 1.5:1, and more preferably in the range from 1:1 to1.45:1, more preferably in the range from 1.05:1 to 1.4:1, and more preferably in the range from 1.10:1 to 1.35:1.

The coating can be either partially or completely cured before the application of the next layer, e.g. the carrier layer.

According to one embodiment, the component (A) and the component (B) are mixed together, applied to the releasing film, and pre-cured by being heated in an oven at a temperature of e.g. from 70° C. to 130° C., preferably from 75° C. to 100° C. for a short duration of 10 seconds to 5 minutes, preferably from 30 seconds to 2 minutes, more preferably from 45 to 90 seconds. Then the carrier layer (e.g. a textile fabric) is applied to the pre-cured 2K PU foam layer with the assistance of a pressing roller, followed by being post cured at a higher temperature of e.g. from 105° C. to 150° C., preferably from 110° C. to 140° C. for a longer duration of 2 to 20 minutes, preferably from 3 to 10 minutes, more preferably from 4 to 10 minutes. The above stated two-step curing process aims to ensure high adhesion strength between the pre-cured 2K PU foam and the carrier layer. According to one embodiment, the resultant 2K foam PU layer has a thickness of from 0.01 to 1000 μm, preferably from 10 to 500 μm, and more preferably from 200 to 500 μm.

According to a preferable embodiment of the present disclosure, the releasing film/release layer is removed after the 2K PU foam has been fully cured. The release layer can be peeled off via any ordinary technologies.

According to a preferable embodiment of the present disclosure, after the removal of the release layer, a top finishing layer can be applied onto the surface of the artificial leather (i.e. on the outermost surface of the top coating layer) and dried to form a protection film layer. The presence of the finishing layer can further increase abrasion resistance of the multilayer artificial leather. The protection film layer may be formed by using any suitable raw materials and technologies. The finishing layer may optionally comprise additives such as wetting agent, crosslinking agent, binder, matting agent, hand-feel modifier, pigments and/or colorants, thickener or other additives used for the top coating layer. The artificial leather disclosed herein can further comprise one or more than one optional additional layer such as a color layer between the skin layer and the finishing layer. Other suitable optional additional layers can be selected from a water repellent layer, UV protective layer and tactile (touch/feel) modification layer.

Figure 2:
FIG. 2 is a schematic illustration of a process for preparing an artificial leather article described herein.
Figure 3A:
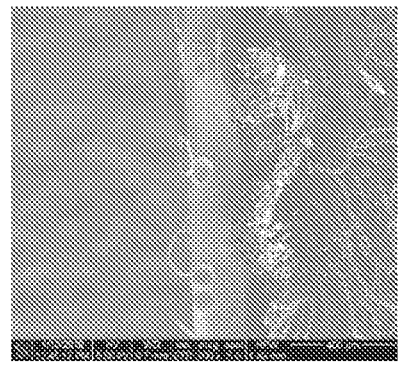
FIG. 3a to FIG. 3e show the Scanning Electron Microscope (SEM) of the cross section and surface of the PU foams manufactured in the inventive examples and control example of the present disclosure.
Figure 3B:
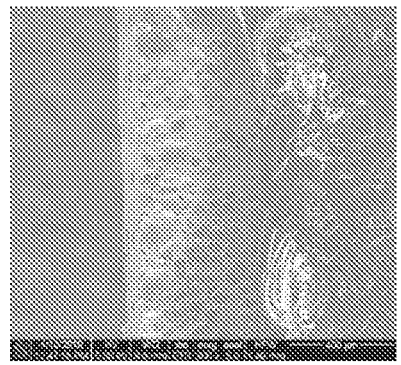
Figure 3C:
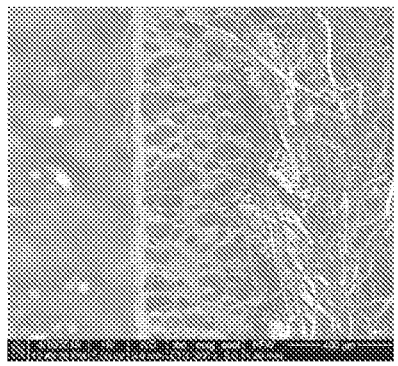
Figure 3D:
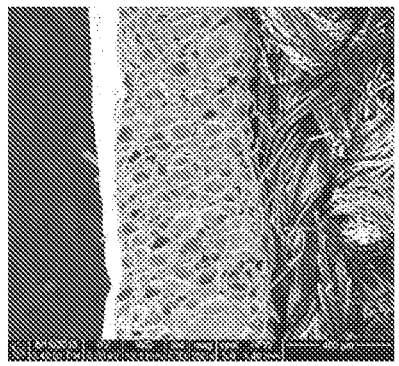
Figure 3E:
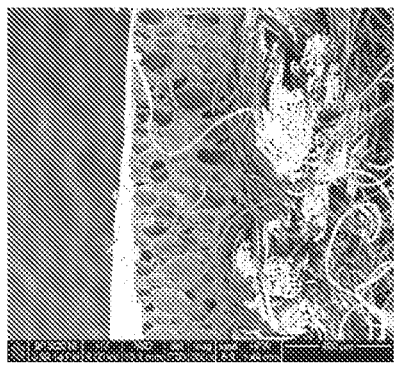

The process of the present invention may be carried out continuously or batchwise. An example of the continuous process is a roll to roll process, and is schematically shown in FIG. 2. A roll of the releasing film/release layer is unwound and transmitted through two or more work station where the mixture for the 2K non-solvent PU foam are applied. Heating or irradiation devices may be arranged after each coating station to promote the drying or curing of the coated layer, and rollers can also be used for enhancing the adhesion strength between the layers. The unwound release layer is generally from 10 to 20,000 meters, from 10 to 15,000 meters and preferably from 20 to 10,000 meters in length and is typically transmitted at a speed in the range from 0.1 to 60 m/min, preferably from 3 to 45 m/min, more preferable from 5 to 15 m/min. In the end of the continuous technology, the release layer is peeled off and wound up on a spindle. The wound-up release layer may be reused, preferably for at least 2 times.

The carrier layer/backing substrate/leather base can be provided in a roll to roll mode, i.e. the carrier layer is provided as a roll, unwound and applied on the surface of the partially cured 2K non-solvent PU foam, then the 2K non-solvent PU foam is fully cured and the laminated artificial leather article can be wound on a spindle and stored/sold as a roll.

In one preferred embodiment, the artificial leather is oriented by being stretched in one or two directions (i.e. uniaxial or biaxial orientation). The dimension of the oriented artificial leather may be increased by a factor of 1.1 to 5, preferably by a factor of 1.2 to 2. The oriented artificial leather exhibits improved breathability.

The multilayer structure artificial leather disclosed herein can be cut or otherwise shaped so as to have a shape suitable for any desired purpose, such as shoe manufacturing. Depending on the intended application, the artificial leathers can be further treated or post-treated similarly to natural leathers, for example by brushing, filling, milling or ironing. If desired, the artificial leathers may (like natural leather) be finished with the customary finishing compositions. This provides further possibilities for controlling their character. The multilayer structure disclosed herein may be used in various applications particularly suitable for use as artificial leather, for example, footwear, handbags, belts, purses, garments, furniture upholstery, automotive upholstery, and gloves. The multilayer structure is particular suitable for use in automotive applications.

EXAMPLES

Some embodiments of the invention will now be described in the following Examples. However, the scope of the present disclosure is not, of course, limited to the formulations set forth in these examples. Rather, the Examples are merely inventive of the disclosure.

The information of the raw materials used in the examples is listed in the following table 1:

TABLE 1

Raw materials used in the examples

| Components | Grades | Suppliers |
|---|---|---|
| Polyether polyol | VORANOL ™ CP 6001 | Dow Chemical |
| Polyether polyol | VORANOL ™ 4240 | Dow Chemical |
| Grafted polyethter polyol | SPECFLEX ™ NC 701 | Dow Chemical |
| Dioctyltin mercaptide catalyst | FOMREZ UL-29 | Momentive |
| Encapsulated foaming agent | Expancel 031 DU40 | Nouryon |
| Encapsulated foaming agent | Expancel 043 DU80 | Nouryon |
| Polyurethane-prepolymer | SPECFLEX ™ NE 1156 | Dow Chemical |

Preparation Examples 1~4 and Control Example: Synthesis of the Non-Solvent Two-Component Polyurethane Composition In the preparation examples and control example, VORANOL™ CP 6001, VORANOL™ 4240, SPECFLEX™ NC 701, FOMREZ UL-29 and Expancel 031 DU40/Expancel 043 DU80 were mixed with a FlackTek speed mixer (Model #: DAC150.1 FVA) at 2500 rpm for 2.5 min. This mixer can mix the samples without producing any bubbles therein. Then SPECFLEX™ NE 1156 was added into the reaction system and mixed with the FlackTek speed mixer at 2500 rpm for 0.5 min to produce a PU-prepolymer/polyol mixture.

A continuous coating apparatus shown in FIG. 2 was used in these examples, wherein the above stated PU-prepolymer/polyol mixture was applied onto a release paper by a knife with a gap controller. The coated release paper was pre-cured in an oven at 90° C. for 40 s. A fabric was optionally applied onto a surface of the PU resin layer opposite to the release paper with the assistance of a 3.9 Kg roller. The laminate thus formed was fully cured in an oven at 140° C. for 4 min. The cured product was cooled to ambient temperature, after which the release paper was peeled off, and the final product was cut into standard samples for testing.

TABLE 2

Recipes of Inventive Examples 1 to 4 and the Control Example

| Materials | Content/% | | | | |
|---|---|---|---|---|---|
| | Control | Example 1 | Example 2 | Example 3 | Example 4 |
| VORANOL ™ CP 6001 | 45 | 45 | 45 | 45 | 45 |
| VORANOL ™ 4240 | 40 | 40 | 40 | 40 | 40 |
| SPECFLEX ™ NC 701 | 10 | 10 | 10 | 10 | 10 |
| FOMREZ UL-29 | 0.026 | 0.026 | 0.026 | 0.026 | 0.026 |
| Expancel 031 DU40 | 0 | 3 | 0 | 6 | 0 |
| Expancel 043 DU80 | 0 | 0 | 3 | 0 | 6 |
| SPECFLEX ™ NE 1156 | 55 | 57 | 57 | 59 | 59 |

Technologies for Characterizing the PU Film
Tensile Strength of PU Film

A Pure PU film was prepared by following the above process without applying the fabric. The resultant PU film was cut into micro "dog" bone samples according to ASTM D638-10. The upper and bottom ends of each sample were fixed on an Instron machine and the tensile strength thereof were characterized with a speed of 50 cm/min. The resin film properties are listed in Table 3.

Peel Strength of Leather

The three-layer laminate comprising release paper, PU flayer and latex was cut into leather specimens having size of 20 cm×3 cm, and the specimens were coated with epoxy glue on the skin surface thereof. Then each specimen was folded with the epoxy coated surface facing each of to form a 10 cm×3 cm specimen. The folded specimen was pressed, and cured at room temperature overnight. Then the tests for T-model peel strength, Elongation and Modulus @100% were conducted on an Instron. Force device to record the peel force for peeling the two faces apart. Three specimens were tested for each sample, the resultant peel force was recorded and summarized in Table 4. The normal request for the peel strength is >20N in the industry, >40N for the middle end, and >80N for the high end product.

Bally Flex of Leather

Each direction of the synthetic leather was cut into two 7.5 cm×4.5 cm leather sheets. Two different direction samples were fixed on two Bally Flex machines (one for testing room temperature Bally Flex; the other for testing −15° C. Bally Flex; and each temperature test needs two direction samples). These two pairs of Bally Flex were tested with a speed of 100 times/min. The room temperature (RT) Bally Flex test requires 100000 times, and the −15° C. Bally Flex test requires 30000 times. Bally Flex characterization data were listed in Table 5. The low end request is 50000 times for RT, and the high end request is 100000 times for RT and 30000 times at −15° C.

SEM Image of Leather

Scanning Electron Microscope (SEM) photographs of the cross section and surface of the PU foam layers were taken under an accelerated electron voltage of 5.00 KV. The cross section was exposed by cutting the specimen with a knife, and the FIG. 3a to FIG. 3e show the Scanning Electron Microscope (SEM) of the cross section and surface of the PU foams manufactured in the inventive examples, comparative example and control example of the present disclosure.

TABLE 3

Tensile strength performance

|  | Control | Inv. Ex. 1 | Inv. Ex. 2 | Inv. Ex. 4 |
|---|---|---|---|---|
| Tensile strength/MPa | 8.41 | 1.99 | 1.29 | 0.53 |
| Elongation/% | 638 | 420 | 323 | 145 |
| Modulus @ 100%/MPa | 1.61 | 0.82 | 0.84 | 0.47 |

TABLE 4

Bally Flex performance

|  | Control | Inv. Ex. 1 | Inv. Ex. 2 | Inv. Ex. 3 | Inv. Ex. 4 |
|---|---|---|---|---|---|
| Axial direction (RT)/times | >100000 | >100000 | >100000 | >100000 | >100000 |
| Cross direction (RT)/times | >100000 | >100000 | >100000 | >100000 | >100000 |
| Axial direction (−15° C.)/times | >30000 | >30000 | >30000 | >30000 | >30000 |
| Cross direction (−15° C.)/times | >30000 | >30000 | >30000 | >30000 | >30000 |

TABLE 5

Peel strength performance

|  | Control | Inv. Ex. 1 | Inv. Ex. 2 | Inv. Ex. 3 | Inv. Ex. 4 |
|---|---|---|---|---|---|
| Peel strength N/(3 cm) | 20 | 42 | 62 | 29 | 44 |

CONCLUSIONS

According to the micro-morphologies shown in FIGS. 3a to 3e, the encapsulated foaming agent can produce uniform bubbles in PU resin having good handfeeling without using any stabilizers. The mechanical performance properties of the foamed PU resin meet the ordinary requirements on the foamed materials. As can be seen from Table 4, the unfoamed sample and foamed samples exhibit comparable Bally Flex results, and all the samples pass the highest requirement of Bally Flex in leather industry. The unfoamed PU leather does not exhibit high peel strength, which may be due to a faster reaction rate before the fabric being applied onto the 2K PU foam layer. Furthermore, the foamed PU samples with low amount of foaming agent can achieve performance properties better than those comprising higher amount of foaming agent.

What is claimed is:

1. A non-solvent two-component polyurethane artificial leather composition, comprising
   (A) a polyurethane-prepolymer component, comprising one or more polyurethane-prepolymers prepared by reacting at least one polyisocyanate compound with at least one first polyol, wherein the polyurethane-prepolymer comprises at least two free isocyanate groups, the polyurethane-prepolymer having a NCO content of 10 to 20 wt % and a viscosity of 50 to 10,000 cSt; and
   (B) a polyol component, comprising at least one second polyol;
   wherein the polyol component further comprises an encapsulated foaming agent comprising at least one foaming core phase encapsulated within an outer shell.

2. The composition according to claim 1, wherein the foaming core phase comprises at least one member selected from the group consisting of $C_3$-$C_{16}$ aliphatic hydrocarbon optionally substituted with at least one chlorine atom and/or fluorine atom, $C_6$-$C_{16}$ cycloaliphatic or aromatic hydrocarbon optionally substituted with at least one chlorine atom and/or fluorine atom, $C_2$ to $C_{16}$ ether compound optionally substituted with at least one chlorine atom and/or fluorine atom, tetra ($C_1$-$C_6$ alkyl) silane, tetra ($C_1$-$C_6$ alkoxy) silicon, water, carbonamide compound, hydrazide, polyamine, nitrile, carboxylate salt, bicarbonate salt, organic sulfate salt, carbon dioxide, carbon monoxide, and combinations thereof; and
   the outer shell comprises at least one member selected from the group consisting of acrylic resin, phenolic resin, alkyd resin, polyester resin, amino resin, epoxy resin, copolymers thereof and blends thereof.

3. The composition according to claim 2, wherein the foaming core phase comprises at least one member selected from the group consisting of propane, butane, pentane, cyclopentane, trichlorofluoromethane, dichlorodifluoromethane, 1,1-dichlorofluoroethane, dichlorotrifluoroethane, dichlorodifluoroethane, dichlorotetrafluoroethane, trichlorotrifluoro-ethane, 1,1,1,3,3-pentafluoropropane, perfluoropropane, water, azodicarbonamide, benzene-sulfonyl hydrazide, N,N'-dinitrosopentamethylene tetramine, toluenesulfonyl hydrazide, azobisisobutyronitrile, barium azodicarboxylate, sodium bicarbonate, potassium bicarbonate, ammonium bicarbonate, iron bicarbonate, sodium dodecyl sulfate, nitrogen, carbon dioxide, carbon monoxide, and combinations thereof; and/or the outer shell comprises homopolymer or copolymer formed by at least one monomer selected from the group consisting of acrylonitrile, methacrylonitrile, a-chloroacrylonitrile, a-ethoxyacrylonitrile, fumaronitrile, methacrylic acid, itaconic acid, maleic acid, fumaric acid, citraconic acid, vinyl chloride, vinylidene chloride, vinyl bromide, vinyl fluoride, vinyl acetate, vinyl propionate, vinyl butyrate, methyl (meth)acrylate, ethyl (meth)acrylate, propyl (meth)acrylate, n-butyl (meth)acrylate, isobutyl (meth)acrylate, t-butyl (meth)acrylate, n-octyl (meth)acrylate, dodecyl (meth)acrylate, 2-ethylhexyl (meth)acrylate, stearyl (meth)acrylate, 2-chloroethyl (meth)acrylate, phenyl (meth)acrylate, isobonyl (meth)acrylate, cyclohexyl (meth)acrylate, benzyl (meth)acrylate, β-carboxyethyl (meth) acrylate, 2-hydroxyethyl (meth)acrylate, 2-hydroxypropyl (meth)acrylate, styrene, methylstyrene, ethylstyrene, dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, n-methoxystyrene, p-phenylstyrene, p-chlorostyrene, 3,4-dichlorostyrenechlorostyrene, acrylamide, methacrylamide, N-phenyl maleimide, N-(2-chlorophenyl) maleimide, N-cyclohexyl maleimide, N-laurylmaleimide, ethylene, propylene, butylenes, isobutylene, vinylmethylether, vinylethylether, vinylisobutylether, vinylmethylketone, vinylhexylketone, methylisopropenyllketone, N-vinylpyrrole, N-vinylcarbazole, N-vinylindole, N-vinylpyrrolidone, allyl methacrylate, ethylene glycol dimethacrylate, diethylene glycol dimethacrylate, triethylene glycol dimethacrylate, polyethylene glycol dimethacrylate, trimethyloipropane trimethacrylate, pentaerithrityl tetramethacrylate, bis(metacryloyloxymethyl)tricyclodecane, and blends thereof.

4. The composition according to claim 1, wherein the content of the encapsulated foaming agent is from 2 to 7 wt %, based on the total weight of the polyol component (B).

5. The composition according to claim 1, wherein the content of the encapsulated foaming agent is from 2.5 to 3.5 wt %, based on the total weight of the polyol component (B).

6. The composition according to claim 1, wherein the encapsulated foaming agent has at least one of the following parameters:
a) having a particle size of 5 to 40 μm;
b) having a outer shell thickness of 0.1 to 10 μm;
c) being able to expand, irreversibly or reversibly, by 2 to 10 times in particle size when heated;
d) having a pre-expansion density of 30 kg/cm³ or less;
e) having an expansion starting temperature of 80° C. to 150° C.; and
f) having a softening temperature of 120° C. to 235° C.

7. The composition according to claim 1, wherein the encapsulated foaming agent has a particle size of 16-24 μm, a expansion starting temperature of 95-115° C., a pre-expansion density of 10 kg/cm³ or less, softening temperature of 147° C. to 167° C.; and wherein the outer shell is formed with acrylic resin, and the foaming core phase is $C_3$-$C_{16}$ aliphatic hydrocarbon optionally substituted with at least one chlorine atom and/or fluorine atom.

8. The composition according to claim 1, wherein the polyisocyanate compound is selected from the group consisting of $C_4$-$C_{12}$ aliphatic polyisocyanate comprising at least two isocyanate groups, $C_6$-$C_{15}$ cycloaliphatic or aromatic polyisocyanate comprising at least two isocyanate groups, $C_7$-$C_{15}$ araliphatic polyisocyanate comprising at least two isocyanate groups, and any combinations thereof; and each of the first polyol and the second polyol is independently selected from the group consisting of $C_2$-$C_{16}$ aliphatic polyhydric alcohols comprising at least two hydroxyl groups, $C_6$-$C_{15}$ cycloaliphatic or aromatic polyhydric alcohols comprising at least two hydroxyl groups, $C_7$-$C_{15}$ araliphatic polyhydric alcohols comprising at least two hydroxyl groups, polyester polyols having a molecular weight from 100 to 5,000 and an average hydroxyl functionality of 1.5 to 5.0, a polyether polyol which is a poly($C_2$-$C_{10}$)alkylene glycol or a copolymer of multiple ($C_2$-$C_{10}$)alkylene glycols having a molecular weight from 100 to 5,000, polycarbonate diols having a molecular weight from 100 to 5,000, $C_2$-$C_{10}$ alkanolamine comprising at least one hydroxyl group and at least one amino groups, and combinations thereof.

9. The composition according to claim 1, wherein the weight ratio between the polyurethane-prepolymer component (A) and the polyol component is from 100:40 to 100:60.

10. The composition according to claim 1, wherein the second polyol includes a polyether polyol modified with comonomers of styrene and acrylonitrile, having a molecular weight from 2,000 to 3,000, an average OH number of 20 to 25 mg KOH/g, a viscosity of 4500-4900 cSt, and a solid content of 25 wt % to 45 wt %.

11. The composition according to claim 1, wherein the composition comprises no higher than 2 wt % of water solvent and no higher than 2 wt % of organic solvent; or the composition is free of water solvent and is free of organic solvent.

12. The composition according to claim 1, wherein the composition does not comprise any forming agents other than the encapsulated foaming agent; and/or the composition does not comprise foaming stabilizer.

13. A method for preparing an artificial polyurethane leather product by using the composition according to claim 1, comprising i) reacting the polyisocyanate compound with the first polyol to form the (A) polyurethane-prepolymer component comprising one or more polyurethane-prepolymers;

ii) mixing the (A) polyurethane-prepolymer component with the (B) polyol component to form a precursor mixture;

iii) applying the precursor mixture onto one surface of a releasing film to form a green layer;

iv) optionally applying a carrier layer onto a surface of the green layer opposite to the releasing film;

iv) heating the green layer to form a foamed polyurethane leather layer; and v) optionally, peeling off the foamed polyurethane leather layer from the releasing film.

14. An artificial polyurethane leather product prepared by the method of claim 13, wherein the product comprises a foamed polyurethane leather layer, an optional releasing film and an optional carrier layer.

15. A non-solvent two-component polyurethane artificial leather composition, comprising
- (A) a polyurethane-prepolymer component, comprising one or more polyurethane-prepolymers prepared by reacting at least one polyisocyanate compound with at least one first polyol, wherein the polyurethane-prepolymer comprises at least two free isocyanate groups; and
- (B) a polyol component, comprising at least one second polyol; wherein:
- the polyol component further comprises an encapsulated foaming agent comprising at least one foaming core phase encapsulated within an outer shell, and
- the second polyol includes a polyether polyol modified with comonomers of styrene and acrylonitrile, having a molecular weight from 2,000 to 3,000, an average OH number of 20 to 25 mg KOH/g, a viscosity of 4500-4900 cSt, and a solid content of 25 wt % to 45 wt %.

* * * * *